Dec. 15, 1936.  A. C. BRUNS  2,064,149

THERMOMETER

Filed May 14, 1935

INVENTOR.
Anthony C. Bruns
BY
Wood & Wood
ATTORNEYS.

Patented Dec. 15, 1936

2,064,149

UNITED STATES PATENT OFFICE 2,064,149

THERMOMETER

Anthony C. Bruns, Cincinnati, Ohio, assignor to The Palmer Company, St. Bernard, Ohio, a corporation of Ohio Application May 14, 1935, Serial No. 21,430

6 Claims. (Cl. 73—52)

This invention relates to thermometers and is particularly directed to improvements in thermometers of that type adapted to be associated with containers for displaying or registering the temperature of material within the container. This type of thermometer showing the temperature of material within a container is used in a great many fields where it is desired to mix, treat, combine, or operate upon material in a liquid, fluid, or plastic state at a given temperature or within a certain temperature range.

A primary consideration in the present invention is the problem of getting a reading of the true temperature of a plastic as opposed to the surface temperature. Some plastics such as dough have a skin or coating which is of a different temperature from that within the mass.

Another consideration is the fact that the average bowl or container has a curved bottom making it difficult to read a thermometer attached thereto when the graduations are disposed vertically since the lowermost graduations recede beyond the line of vision, particularly in the instance of small bowls, and are extremely difficult to see from positions above the bowl.

It is a further consideration that the thermometer must accurately register the temperature within the container uninfluenced by temperature outside the container.

Because of the necessity for locating the thermometer bulb closely adjacent to the material and providing extreme sensitiveness, it is necessary that the bulb be mounted in an improved manner for proper protection against breakage.

It is therefore the object of this invention to provide a thermometer of the above mentioned character which solves all the above mentioned problems and meets each listed requirement, whereby the thermometer is accurate as to temperature inside the container, particularly as to the temperature within the mass of the material in the container, is easily read, and is not easily damaged.

Other objects and further advantages will be more fully apparent from a description of the accompanying drawing, in which.

Figure 1:
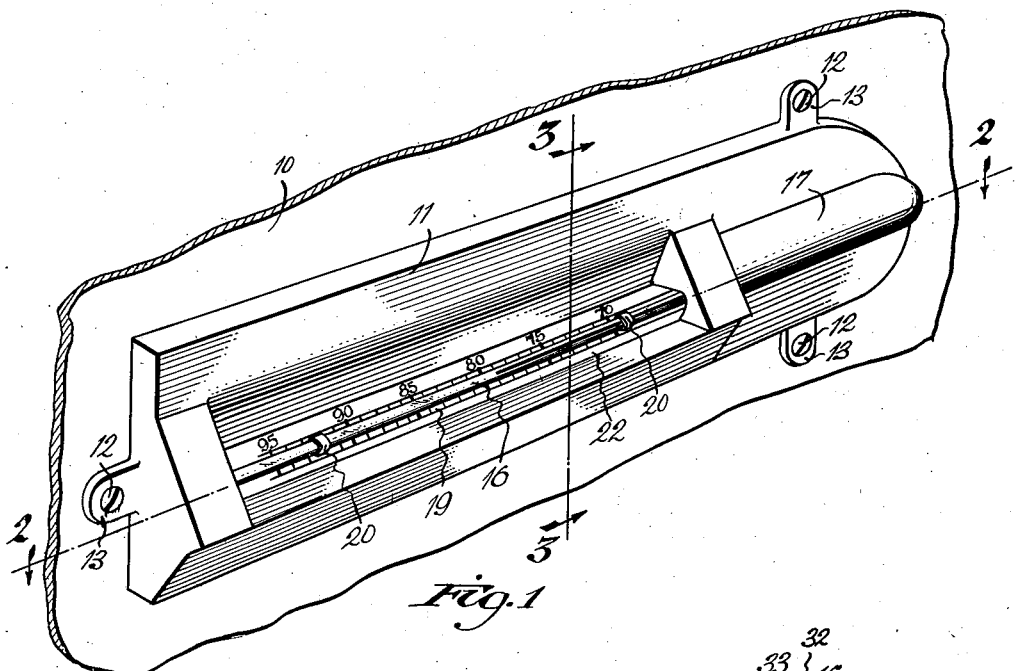
Figure 1 is a perspective view of the thermometer, showing it applied to the side of a container.
Figure 2:
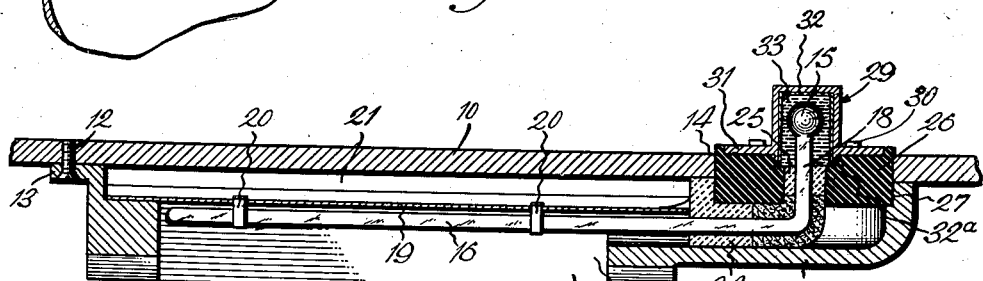
Figure 2 is a sectional view taken on line 2—2, Figure 1, illustrating the details of the mounting of the thermometer.
Figure 4:
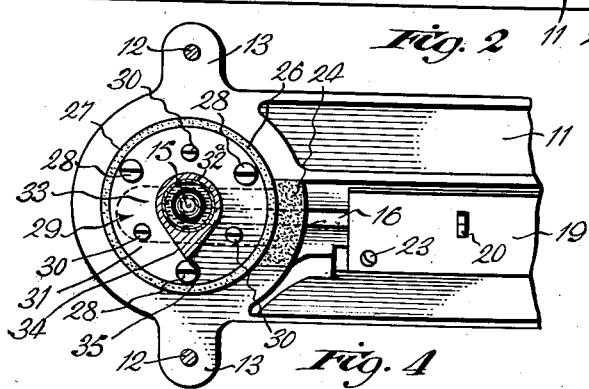
Figure 4 is a sectional view taken on line 4—4 Figure 3, showing the bulb container chamber in detail.
Figure 3:
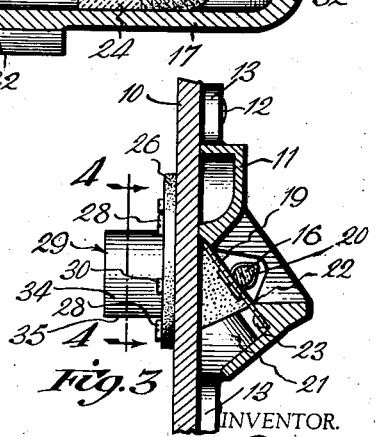
Figure 3 is a sectional view taken on line 3—3, Figure 1, additionally illustrating the details.

A preferred embodiment of the invention includes a tube thermometer for use in determining the temperature of a material in a container having its bulb portion disposed or mounted for maximum conductivity of heat or cold from the interior of the container and insulation against influence from outside temperature conditions. The chamber surrounding the bulb is shaped for splitting the material particularly a plastic one such as dough and subjecting the bulb to the true temperature of the material mass as opposed to its skin or coating. Also, it is arranged that the graduations are disposed on a horizontal plane for convenience in reading.

Referring to the drawing, the container is shown at 10. A body or support element 11 for the thermometer is secured to the container by means of screws 12 extended through lugs 13 of the body element into the container wall.

The container wall is provided with a circular opening 14 for admission of a portion of the thermometer assembly including the bulb 15 of the thermometer tube 16 into the interior of the container. The thermometer tube 16 is mounted along the open face of the body or support element, passes behind a forward wall 17 of the element and includes an angular extension 18 turned through the opening of the container and having the conventional bulb 15 thereon.

This tube is supported or attached as follows. Its straight or reading portion is attached to a scale or graduation plate 19 by means of clips 20. The plate is secured against the rear wall of the body element to the rear face of a recess 21 thereof over an opening 22 by means of screws 23.

Back under the wall 17 a support wall 24 is built up of refractory or cement material and securely sustains the tube against movement. The angular extension is sustained by another wall or block 25 of refractory or cement material, also serving to insulate the bulb from outside temperature influences. The bend of the thermometer between the blocks of refractory material 24 and 25 is packed in cotton or some other fibrous material.

This latter insulator wall is formed within the central aperture of a heavy disc 26 formed of insulating material such as hard rubber. This disc is disposed snugly in the circular opening of the container and is held in a circular recess 27 of the body element by means of screws 28.

A casing 29 shaped like a hat is secured in a recess of the disc 26 by means of screws 30 extended through the flange 31 of the casing into the disc. A thimble 32 is secured in nested position in the cylindrical portion of the casing. The outer end 32a of the thimble projects into a further recess of the disc for spanning and sealing the joint between the casing and the disc.

Some good conductor of heat or cold, either fluid or solid, preferably mercury shown at 33, fills the chamber and surrounds the bulb. Thus, although the bulb is in direct metallic contact with the casing wall, it is in no danger of being broken due to the presence of the conductive or material in direct contact therewith. Obviously, the mercury does not entirely fill the chamber so that expansion can take place.

The casing and thimble walls are relatively thin and are formed of metal which is a good conductor of heat or cold. The casing is formed in this instance of brass and the thimble of steel for the purpose of protecting the brass from the amalgamating action of the mercury. It will be understood that the casing could be of one piece if made of a metal which would not be damaged by the action of the mercury. However, considering cost the present structure is preferred. Any metal or combination of metals providing maximum conductivity and adequate protection against the action of the mercury is or are adaptable.

The casing is generally cylindrical having a wedge shaped lug 34 projected laterally therefrom. In other words, the sides of the lug are disposed tangentially of the cylindrical casing and a sharp edge 35 is provided.

The purpose or function of this lug is to split the dough by virtue of the sharp edge and wedge shape whereby the true temperature of the mass is obtained. The cylindrical casing projects into the dough and the wedge shaped lug splits the coating and penetrates the mass a sufficient distance whereby conduction of the heat or cold takes place from this sharp edged lug to the bulb by way of the mercury.

The use of this plastic splitting means provides a highly accurate temperature reading. The bulb is fully protected and cannot be damaged. The bulb is insulated from outside temperature influence by virtue of its mounting on the insulating disc. The disc also serves to insulate the bulb against undue shock or vibration.

Having described my invention, I claim:

1. A thermometer, comprising, a support element bearing a scale, a mercury tube mounted in relation to said scale and including a bulb element projected angularly from the support, a casing element surrounding the bulb, means for insulating said casing element from the support, said casing element including a plastic splitting device thereon, and a conductive material within the housing closely surrounding the bulb whereby the heat of the plastic is readily conducted to the bulb and accurately recorded on the scale.

2. In combination with an apertured container, a thermometer frame fixed to the side of the container and including a temperature scale, a thermometer tube fixed in the frame relative to the scale and including an angular extension carrying the bulb and disposing the bulb within the container, an insulating disc secured in the aperture of the container and supporting the angular extension of the thermometer tube, a housing surrounding the bulb and fixed to the insulating disc, said housing formed of a metal having good heat conductive properties and formed to penetrate the coating of a plastic, and means establishing contact between the casing and the bulb whereby the temperature of the plastic mass is accurately indicated.

3. A thermometer for use in determining the temperature of plastic material within a container, comprising, a mercury tube extended along the outside of the container and having its bulb insulated from the outside of the container, and an element associated with the bulb for conducting the heat or cold from the material within the container to the bulb, said element incorporating a sharp portion for splitting the plastic material and conducting the temperature of the mass, rather than the outer skin, to the bulb.

4. A thermometer for use in determining the temperature of material within a container, comprising, an apertured container, a scale bearing support element disposed horizontally relative to the aperture of the container, and attached in position flush against the side wall of the container, a thermometer tube fixed on the container in relation to the scale and having its bulb portion projected through the aperture of the container, means for insulating the bulb from the outside of the container, and a protective housing surrounding the bulb formed of metal having good conductive properties, said protective housing being insulated from the container whereby the temperature of the material within the container may be accurately determined, and said temperature easily read on the horizontally disposed scale.

5. A thermometer for use in determining the temperature of plastic material in a container, comprising, a mercury tube, a housing containing the bulb of the tube, said housing having a wedge-shaped extension from its periphery providing a sharp portion for splitting the outer surface of the plastic material.

6. A thermometer for use in determining the temperature of a plastic material in a container, comprising, a mercury tube, a housing containing the bulb of the tube, said housing having a wedge-shaped extension from its periphery providing a sharp portion for splitting the outer surface of the plastic material, and mercury within the housing surrounding the bulb for establishing contact between the bulb and the housing for conducting the heat of the plastic to the bulb.

ANTHONY C. BRUNS.